US010851216B2

United States Patent
Ozawa

(10) Patent No.: US 10,851,216 B2
(45) Date of Patent: Dec. 1, 2020

(54) BLACK FILM

(71) Applicant: KURARAY CO., LTD., Kurashiki (JP)

(72) Inventor: Yushi Ozawa, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/309,635

(22) PCT Filed: Jun. 13, 2017

(86) PCT No.: PCT/JP2017/021868
§ 371 (c)(1),
(2) Date: Dec. 13, 2018

(87) PCT Pub. No.: WO2017/217429
PCT Pub. Date: Dec. 21, 2017

(65) Prior Publication Data
US 2019/0218353 A1    Jul. 18, 2019

(30) Foreign Application Priority Data

Jun. 14, 2016  (JP) ................................ 2016-118284

(51) Int. Cl.
| | | |
|---|---|---|
| *C08J 5/18* | (2006.01) |
| *B32B 27/20* | (2006.01) |
| *B29C 55/04* | (2006.01) |
| *B32B 27/30* | (2006.01) |
| *B29C 48/00* | (2019.01) |
| *C08J 7/04* | (2020.01) |
| *C08L 33/12* | (2006.01) |
| *B29C 48/69* | (2019.01) |
| *B29K 33/00* | (2006.01) |
| *C08K 3/04* | (2006.01) |
| *C08K 5/00* | (2006.01) |
| *C08K 5/18* | (2006.01) |

(52) U.S. Cl.
CPC ............... *C08J 5/18* (2013.01); *B29C 48/00* (2019.02); *B29C 55/04* (2013.01); *B32B 27/20* (2013.01); *B32B 27/30* (2013.01); *C08J 7/0427* (2020.01); *C08L 33/12* (2013.01); *B29C 48/69* (2019.02); *B29K 2033/12* (2013.01); *B29K 2995/002* (2013.01); *C08J 2333/12* (2013.01); *C08K 3/04* (2013.01); *C08K 5/0041* (2013.01); *C08K 5/18* (2013.01); *C08L 2203/16* (2013.01); *C08L 2205/02* (2013.01)

(58) Field of Classification Search
None
See application file for complete search history.

(56) References Cited

U.S. PATENT DOCUMENTS

| | | | | | |
|---|---|---|---|---|---|
| 2008/0245270 | A1* | 10/2008 | Klei | ................... | C08L 25/06 106/287.2 |
| 2010/0020396 | A1* | 1/2010 | Izumi | ................ | G02F 1/133528 359/485.01 |
| 2010/0323159 | A1* | 12/2010 | Osada | ................... | B29C 55/023 428/141 |
| 2015/0284596 | A1* | 10/2015 | Nakada | ................... | C09J 7/385 428/355 AC |

FOREIGN PATENT DOCUMENTS

| | | |
|---|---|---|
| CN | 101588593 A | 10/2009 |
| CN | 101610901 A | 12/2009 |
| JP | 2003-96286 A | 4/2003 |
| JP | 2010-82871 A | 4/2010 |
| JP | 2010-163576 A | 7/2010 |
| JP | 2012-213891 A | 11/2012 |
| JP | 2013-28052 A | 2/2013 |
| JP | 2014-138985 A | 7/2014 |
| WO | WO 2018/003863 A1 | 1/2018 |

OTHER PUBLICATIONS

International Search Report dated Sep. 12, 2017 in PCT/JP2017/021868 filed Jun. 13, 2017.
Extended European Search Report dated Jan. 20, 2020, in Patent Application No. 17813324.5, citing document AO therein, 8 pages.
Combined Chinese Office Action and Search Report dated Jun. 3, 2020, in Patent Application No. 201780038930.4 (with English translation), citing documents AO and AP therein, 22 pages.

* cited by examiner

*Primary Examiner* — Robert T Butcher
(74) *Attorney, Agent, or Firm* — Oblon, McClelland, Maier & Neustadt, L.L.P.

(57) ABSTRACT

A black film containing a thermoplastic resin (A) that contains two or more types of dyes other than black, where a thickness T is 45 to 550 µm, a total concentration C of the dyes other than black is 0.4 to 5 mass % with respect to the thermoplastic resin (A), the total concentration C of the dyes and the thickness T satisfy the following expression (1):

$$C \times T \geq 210 \quad (1)$$

where in a L*a*b* color system measurement compliant with JIS Z 8781-4, L* (lightness) is no more than 10, an absolute value of a* is no more than 2.0, and an absolute value of b* is no more than 2.0, and a total light transmittance obtained after the black film is stretched twofold in one axial direction at a temperature higher than a glass transition temperature by 20° C. is no more than 3.0%.

8 Claims, 1 Drawing Sheet

BLACK FILM

TECHNICAL FIELD

The present disclosure relates to black films. In particular, the present disclosure relates to a black film that excels in coal-blackness and that does not yield a color tone difference among identical decorative molded products even after the black film is three-dimensionally molded. In addition, the present disclosure relates to a method of manufacturing such a black film.

BACKGROUND ART

In recent years, in exterior and interior components, such as automobile components, consumer electrical appliances, and interior furniture, there are increasing demands for complex-shaped three-dimensional molded products made primarily of resin for the purpose of improving the design qualities or achieving more lightweight components. To achieve seamless three-dimensional molded products with highly sophisticated designs and to simplify the processing and assembling of molded products, a mainstream technique being employed is an integral molding processing technique. In the integral molding processing technique, for example, resin serving as a main body is overlaid with a decorative film made of resin and having a design, such as a pattern, provided thereon in advance, and these components are molded integrally with a press-molding machine or the like. In this situation, it is desirable that the decorative film have such properties as high moldability, good surface properties, and high design sophistication. There is an increasing demand for thermoforming decorative films having excellent surface glossiness and a sophisticated deep color as in a piano-black design, for example.

Examples of methods of forming a decorative film include insert molding and vacuum forming, aside from the integral molding with a press-molding machine as described above.

In a known insert molding technique, a first layer served by a laminate film in which a decorative layer is fabricated on a back surface of an acryl film through a printing technique such as gravure printing and a photocurable or electron beam curable protection layer is formed on a front surface of the acryl film is dry-laminated onto a second layer where an ABS resin film or the like serves as a backup layer with an adhesive interposed therebetween to fabricate a decorative film. The decorative film is then inserted into a predetermined mold and subjected to vacuum forming, and trimmed off any unnecessary portion. Thereafter, the decorative film is placed into an injection molding mold, and ABS resin or the like is backup-molded through injection molding to fabricate a decorative molded product (Patent Literatures 1 and 2).

Meanwhile, in a known vacuum forming technique, a first layer served by a laminate film is formed in which a base layer is formed of an acryl-based resin, a decorative layer is fabricated through a printing technique such as gravure printing, and a photocurable or electron beam curable protection layer is formed on a surface of the acryl film, and a second layer served by an ABS resin layer and a third layer served by an adhesive resin layer are formed to fabricate a decorative film. The decorative film is then subjected to vacuum forming onto a molded product serving as an adherend to be affixed thereon. A TOM (Three Dimension Overlay Method) is a known vacuum forming technique. In the TOM, for example, the air in the two spaces, within a device, separated by a decorative film fixed to a fixing frame is sucked by a vacuum pump or the like to create a vacuum within the device. At the same time, the decorative film is heated with an infrared heater until the temperature of the decorative film reaches a predetermined temperature at which the decorative film softens, and only one of the two spaces within the device is fed with air at a timing at which the decorative film has been heated and softened. This causes the decorative film to be tightly bonded to a molded product, serving as an adherend, to fit its three-dimensional shape under a vacuum atmosphere (Patent Literature 3).

In manufacturing a film having coal-blackness, pigment (carbon black) is often used for coloring (Patent Literatures 4 and 5). However, when pigment is used, reflection of light off the pigment particle surface yields a whitish hue, and a film that excels in deep and clear coal-blackness cannot be obtained. Furthermore, when a colorant such as pigment represented by carbon black is used at a high concentration, a grainy defect may become visible on the surface of the decorative molded product in which the film is decorated on a molded product, leading to shortcomings in that the design sophistication of the decorative molded product is lost notably.

A black decorative film in which dye, aside from pigment, is used is also known. For example, there is known a sheet for injection molding having two layers, namely, an inner layer and an outer layer. The inner layer and the outer layer each contain a black colorant, and dye and pigment are both used as the black colorant (Patent Literature 6).

CITATION LIST

Patent Literature

Patent Literature 1: Japanese Unexamined Patent Application Publication No. 2010-082871

Patent Literature 2: Japanese Unexamined Patent Application Publication No. 2010-163576

Patent Literature 3: Japanese Unexamined Patent Application Publication No. 2012-213891

Patent Literature 4: Japanese Unexamined Patent Application Publication No. 2003-96286

Patent Literature 5: Japanese Unexamined Patent Application Publication No. 2013-28052

Patent Literature 6: Japanese Unexamined Patent Application Publication No. 2014-138985

SUMMARY OF INVENTION

Technical Problem

However, a decorative molded product obtained through the insert molding technique or the vacuum forming technique described above suffers from shortcomings in that a color tone difference is likely to occur among identical decorative molded products and it is difficult to express deep and clear coal-blackness.

Solution to Problem

To address the above shortcomings, the present inventors have conducted diligent examinations and completed the present disclosure.

Specifically, the present disclosure includes the following aspects.

[1]: A black film comprising:
a thermoplastic resin (A) that contains two or more types of dyes other than black, wherein
a thickness T is 45 to 550 μm,
a total concentration C of the dyes other than black is 0.4 to 5 mass % with respect to the thermoplastic resin (A),
the total concentration C of the dyes and the thickness T satisfy the following expression (1),
in a L*a*b* color system measurement compliant with JIS Z 8781-4, L* (lightness) is no more than 10, an absolute value of a* is no more than 2.0, and an absolute value of b* is no more than 2.0, and
a total light transmittance obtained after the black film is stretched twofold in one axial direction at a temperature higher than a glass transition temperature by 20° C. is no more than 3.0%.

$$C \times T \geq 210 \tag{1}$$

[2]; The black film described in [1], further comprising a surface protection layer composed of a transparent thermoplastic resin (B), wherein a total thickness is 45 to 550 μm.
[3]; The black film described in [1] or [2], wherein the thermoplastic resin (A) and/or the transparent thermoplastic resin (B) are/is a methacrylic resin.
[4]; The black film described in [3], wherein the methacrylic resin contains an acryl-based copolymer (A2) having a structural unit derived from an acrylic acid alkyl ester having a carbon number of 6 to 12, and a content of the structural unit derived from the acrylic acid alkyl ester having a carbon number of 6 to 12 is 2.5 to 25.0 mass % with respect to the methacrylic resin.
[5]; A method of manufacturing the black film described in any one of claims 1 to 4, wherein extrusion molding is carried out through a polymer filter.
[6]; A decorative molded product, wherein the black film described in any one of claims 1 to 4 is laminated on a surface of a base material.

Advantageous Effects of Invention

The black film according to the present disclosure does not result in a see-through black film even after being stretch-molded and excels in deep and clear coal-blackness.

DESCRIPTION OF EMBODIMENTS

Figure 1:
FIG. 1 is a schematic sectional view illustrating an example of a decorative molded product manufactured through vacuum forming with the use of a black film according to the present disclosure.

Hereinafter, examples of embodiments to which the present disclosure is applied will be described. It is needless to say that various design changes can be made as long as such design changes coincide with the spirit of the present disclosure and other embodiments may also be encompassed by the scope of the present disclosure. The numerical values specified in the present specification indicate the values obtained when measurements are carried out through the methods illustrated in the examples described later. In addition, the numerical values "A to B" specified in the present specification indicate a range of values that are no less than a numerical value A nor greater than a numerical value B.

A black film according to the present disclosure is composed of a thermoplastic resin (A) that contains two or more types of dyes other than black. The black film has a thickness T of 45 to 550 μm. A total concentration C of the dyes other than black is 0.4 to 5.0 mass % with respect to the thermoplastic resin (A). The black film satisfies the following expression (1). In a L*a*b* color system measurement compliant with JIS Z 8781-4, L* (lightness) is no more than 10, an absolute value of a* is no more than 2.0, and an absolute value of b* is no more than 2.0. The total light transmittance of the black film that has been stretched twofold in one axial direction at a temperature higher than the glass transition temperature by 20° C. is no more than 3.0%.

$$C \times T \geq 210 \tag{1}$$

<Thermoplastic Resin (A)>

The black film according to the present disclosure is composed of the thermoplastic resin (A). Examples of the thermoplastic resin (A) can include methacrylic resin, styrene-based resin, and polycarbonate resin. From the viewpoint of excellence in weatherability and surface hardness, methacrylic resin is preferable. From the viewpoint of excellence in impact resistance, polycarbonate resin, styrene-based resin, or a mixture thereof is preferable.

<Methacrylic Resin>

Methacrylic resin is a polymer including a structural unit derived from methyl methacrylate. The content of the structural unit derived from methyl methacrylate is preferably no less than 50 mass %, more preferably no less than 70 mass %, yet more preferably no less than 80 mass %, even more preferably no less than 90 mass %, or most preferably no less than 95 mass %.

A solvent-soluble portion of the methacrylic resin preferably has a weight-average molecular weight (Mw) of within a range of 50,000 to 200,000, and the weight-average molecular weight (Mw) is obtained in the polystyrene-equivalent molecular weight through GPC (gel permeation chromatography). When the weight-average molecular weight (Mw) is within this range, excellent extrusion moldability is exhibited when the black film is manufactured. The weight-average molecular weight can be calculated as follows. A GPC device "HLC-8320" manufactured by Tosoh Corporation is used as a device, "TSKguardcolum SuperHZ-H," "TSKgel HZM-M," and "TSKgel SuperHZ4000" manufactured by Tosoh Corporation are coupled in series to serve as a separation column, tetrahydrofuran is used as an eluant, a measurement is carried out at an eluant flow rate of 0.35 mL/min and at a column temperature of 40° C., and the weight-average molecular weight can be calculated from detection data of a differential refractive index (RI).

The methacrylic resin may include only a methacryl-based polymer (A1) in which the content of a structural unit derived from an acrylic acid alkyl ester having a carbon number of 6 to 12 is less than 5 mass % or may be a composition including the methacryl-based polymer (A1) and an acryl-based copolymer (A2) in which the content of a structural unit derived from an acrylic acid alkyl ester having a carbon number of 6 to 12 is more than 5 mass %.

In the methacryl-based polymer (A1), the content of a structural unit derived from methyl methacrylate is preferably no less than 90 mass %. The methacryl-based polymer (A1) may include a structural unit derived from a (meth) acrylic acid ester other than methyl methacrylate or another structural unit.

The methacryl-based polymer (A1) may include a structural unit derived from a monomer other than methyl methacrylate. Examples of such a monomer include an acrylic acid ester such as methyl acrylate or ethyl acrylate; a methacrylic acid ester other than methyl methacrylate; unsaturated carboxylic acid; olefin; conjugated diene; and an aromatic vinyl compound. The tacticity of the (meth)acryl-based polymer is normally atactic, but a (meth)acryl-based polymer in which the tacticity is syndiotactic or the like may also be used.

The acryl-based copolymer (A2) contains more than 5 mass %, preferably no less than 10 mass %, or more preferably no less than 20 mass % of a structural unit derived from an acrylic acid alkyl ester having a carbon number of 6 to 12. The content of this structural unit in the acryl-based copolymer (A2) is preferably no more than 90 mass % or more preferably no more than 80 mass %. The acryl-based copolymer (A2) may include a structural unit derived from a (meth)acrylic acid ester other than an acrylic acid alkyl ester having a carbon number of 6 to 12 or another structural unit. In the acryl-based copolymer (A2), the content of a structural unit derived from methyl methacrylate is preferably less than 90 mass %.

When the acryl-based copolymer (A2) is used, the methacryl-based polymer (A1) and the acryl-based copolymer (A2) are used at a mass ratio [(A1)/(A2)] preferably in a range of from 99/1 to 1/99 or more preferably in a range of from 98/2 to 50/50.

A preferable methacrylic resin is one that includes 50 to 85 mass % of the methacryl-based polymer (A1) described above and 10 to 45 mass % of the acryl-based copolymer (A2) described above.

In the thermoplastic resin (A), the content of a structural unit derived from an acrylic acid alkyl ester having a carbon number of 6 to 12 is preferably 2.5 to 25 mass %. When the content is within this range, the black film tends to excel in toughness and impact resistance.

Examples of the acryl-based copolymer (A2) include a multilayer structure rubber particle composed of a graft copolymer and a block copolymer. One of the above or a combination of two or more of the above can be used.

It is preferable that the multilayer structure rubber particle that can be used as the acryl-based copolymer (A2) have a cross-link polymer layer including a structural unit derived from an acrylic acid alkyl ester having a carbon number of 6 to 12 and be a multilayer structure rubber particle (Y) having a particle size of 0.05 to 0.3 µm. Examples of such a multilayer structure rubber particle include the multilayer structure polymer particle disclosed in Japanese Unexamined Patent Application Publication No. 2004-352837. The multilayer structure rubber particle (Y) is a core-shell structure particle that includes a layer (y-1), a layer (y-2), and a layer (y-3).

The layer (y-1) of the multilayer structure rubber particle is composed of a polymer that essentially includes a structural unit derived from methyl methacrylate (may also be referred to as an MMA unit) and a structural unit derived from a cross-linkable monomer (may also be referred to as a cross-linkable monomer unit) and that includes, as necessary, a structural unit derived from another monomer that can be copolymerized with methyl methacrylate and a cross-linkable monomer (may also be referred to as a monomer (y-1) unit).

The amount of the MMA unit included in the polymer composing the layer (y-1) is preferably 80 to 99.99 mass %, more preferably 85 to 99 mass %, or even more preferably 90 to 98 mass % with respect to the mass of the polymer composing the layer (y-1).

The mass of the layer (y-1) is preferably no less than 0 parts by mass nor more than 50 parts by mass or more preferably no less than 30 parts by mass nor more than 40 parts by mass with respect to 100 parts by mass in total of the layer (y-1), the layer (y-2), and the layer (y-3). When the mass of the layer (y-1) is within this range, an obtained black film excels in heat resistance.

The layer (y-2) of the multilayer particle is composed of a polymer that essentially includes a structural unit derived from an acrylic acid alkyl ester (may also be referred to as an acrylic acid alkyl ester unit) and a cross-linkable monomer unit and that includes, as necessary, a structural unit derived from another monomer that can be copolymerized with an acrylic acid alkyl ester and a cross-linkable monomer (may also be referred to as a monomer (y-2) unit).

The acrylic acid alkyl ester is preferably an acrylic acid alkyl ester having a carbon number of 6 to 12, and examples can include n-propyl acrylate, isopropyl acrylate, n-butyl acrylate, isobutyl acrylate, pentyl acrylate, hexyl acrylate, octyl acrylate, 2-ethylhexyl acrylate, and cyclohexyl acrylate.

The amount of the acrylic acid alkyl ester unit included in the polymer composing the layer (y-2) is preferably 70 to 99.8 mass %, more preferably 75 to 90 mass %, or even more preferably 78 to 86 mass % with respect to the mass of the polymer composing the layer (y-2).

The mass of the layer (y-2) is preferably no less than 40 parts by mass nor more than 70 parts by mass or more preferably no less than 45 parts by mass nor more than 55 parts by mass with respect to 100 parts by mass in total of the layer (y-1), the layer (y-2), and the layer (y-3). When the mass of the layer (y-2) is within this range, an obtained black film has high surface hardness and is less likely to break.

The layer (y-3) of the multilayer particle is composed of a polymer that essentially includes an MMA unit and that includes, as necessary, a structural unit derived from a monomer that can be copolymerized with methyl methacrylate (may also be referred to as a monomer (y-3) unit).

The amount of the MMA unit included in the polymer composing the layer (y-3) is preferably 80 to 100 mass %, more preferably 85 to 100 mass %, or even more preferably 90 to 100 mass % with respect to the mass of the polymer composing the layer (y-3).

The mass of the layer (y-3) is preferably no less than 10 parts by mass nor more than 30 parts by mass or more preferably more than 15 parts by mass and no more than 25 parts by mass with respect to 100 parts by mass in total of the layer (y-1), the layer (y-2), and the layer (y-3). When the mass of the layer (y-3) is within this range, an obtained black film can have higher surface hardness.

The multilayer structure rubber particle may include another layer, aside from the layer (y-1), the layer (y-2), and the layer (y-3). In a preferable multilayer structure rubber particle, the layer (y-1), the layer (y-2), and the layer (y-3) are provided in this order from the inner side to the outer side.

Preferable examples of the block copolymer that can be used as the acryl-based copolymer (A2) include a block copolymer (Z) that includes, in each molecule, independently one or more methacrylic acid ester polymer blocks (z1) including a structural unit derived from a methacrylic acid ester and one or more acrylic acid ester polymer blocks (z2) including a structural unit derived from an acrylic acid ester and that includes the methacrylic acid ester polymer block (z1) at a ratio of 10 to 80 mass % and the acrylic acid ester polymer block (z2) at a ratio of 90 to 20 mass %. The use of such a block copolymer (Z) makes it possible to increase whitening resistance when the black film is bent.

The block copolymer (Z) is preferably a diblock copolymer in which the methacrylic acid ester polymer block (z1) is coupled to one terminal of the acrylic acid ester polymer block (z2) or a triblock copolymer in which the methacrylic acid ester polymer block (z1) is coupled to each of the two terminals of the acrylic acid ester polymer block (z2). Preferable from the viewpoint of impact resistance and extrusion moldability when a black film is manufactured is a block copolymer (Z) that includes 30 to 80 mass % of the acrylic acid ester polymer block (z2) and 20 to 70 mass % of the methacrylic acid ester polymer block (z1) and that has a melt viscosity of 75 to 1500 Pa·s at a temperature of 220° C. and a shear rate of 122/sec.

The proportion of the structural unit derived from an acrylic acid ester in the acrylic acid ester polymer block (z2) is preferably no less than 50 mass %, more preferably no less than 70 mass %, even more preferably no less than 80 mass %, or particularly preferably no less than 90 mass %, and a configuration in which the proportion is 100 mass % is also included.

Examples of the acrylic acid ester include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. The acrylic acid ester polymer block (z2) can be formed by polymerizing one of the above acrylic acid esters alone or a combination of two or more of the above acrylic acid esters. Among the above, an acrylic acid alkyl ester having a carbon number of 6 to 12 is preferable. In particular, n-butyl acrylate is preferable from the viewpoint of low-temperature characteristics or the like, and one obtained by copolymerizing n-butyl acrylate and benzyl acrylate is more preferable from the viewpoint of transparency.

The proportion of the structural unit derived from the methacrylic acid ester in the methacrylic acid ester polymer block (z1) is preferably no less than 80 mass %, more preferably no less than 90 mass %, even more preferably no less than 95 mass %, or particularly preferably no less than 98 mass %, and a configuration in which the proportion is 100 mass % is also included. Such a methacrylic acid ester is preferably methyl methacrylate from the viewpoint of improving transparency and heat resistance. The tacticity of the methacrylic acid ester polymer block (z1) is such that the triad syndiotacticity (rr) is preferably no less than 60%, more preferably no less than 65%, even more preferably no less than 70%, and most preferably no less than 75% from the viewpoint of increasing heat resistance. When the triad syndiotacticity (rr) is no less than 60%, the glass transition temperature can be raised, and the black film can exhibit excellent heat resistance.

The block copolymer (Z) may include, as necessary, a functional group, such as a hydroxyl group, a carboxyl group, an acid anhydride, or an amino group, within the molecular chain or at a terminal of the molecular chain.

The method of manufacturing the block copolymer (Z) is not particularly limited, and a method based on a well-known method can be employed. For example, in a typically used method, monomers constituting the respective polymer blocks are subjected to living polymerization.

<Polycarbonate Resin>

The polycarbonate resin that can be used as the thermoplastic resin (A) is a polymer obtained through a reaction of a polyfunctional hydroxy compound and a carbonic acid ester-forming compound. Examples of the polyfunctional hydroxy compound include 4,4'-dihydroxybiphenyls that may have a substituent and bis(hydroxyphenyl)alkanes that may have a substituent. Among these polyfunctional hydroxy compounds, 2,2-bis(4-hydroxyphenyl)propane is preferable. Examples of the carbonic acid ester-forming compound include various carbonyl dihalides such as phosgene, haloformate such as chloroformate, and a carbonic acid ester compound such as bisaryl carbonate. The amount of the carbonic acid ester-forming compound may be adjusted as appropriate in consideration of the stoichiometric ratio (equivalent) of the reaction.

The polycarbonate resin may contain, aside from a polycarbonate unit, a unit having a polyester, polyurethane, polyether, or polysiloxane structure. The polycarbonate resin that is used favorably in the present disclosure is not particularly limited in its molecular weight. However, from the viewpoint of ease of manufacturing through extrusion molding, a polycarbonate resin having a viscosity-average molecular weight of approximately 13000 to 30000 or a polycarbonate resin having a melt viscosity of approximately 1300 to 6000 Pa·s at 250° C. and at 100 $sec^{-1}$ is preferable. The molecular weight can be adjusted by controlling the amount of a chain-terminating agent or a branching agent.

Examples of the styrene-based resin that can be used as the thermoplastic resin (A) include, aside from polystyrene, a styrene-based polymer, such as acrylonitrile-butadiene-styrene copolymer (ABS resin), styrene-maleimide copolymer, styrene-N-phenylmaleimide copolymer, styrene-N-phenylmaleimide-acrylonitrile copolymer, styrene-N-phenylmaleimide-methyl methacrylate copolymer, styrene-N-phenylmaleimide-butyl acrylate copolymer, rubber-reinforced impact resistant polystyrene, styrene-acrylonitrile copolymer (AS resin), styrene-propylene rubber-reinforced styrene-acrylonitrile copolymer (AES resin), polyacrylic acid ester rubber-reinforced styrene-acrylonitrile copolymer (AAS resin), styrene-methyl methacrylate copolymer (MS resin), or styrene-methyl methacrylate-butadiene copolymer (MBS resin); or a mixture of the above. The styrene-based resin preferably contains no less than 10 mass % of a structural unit derived from styrene.

<Dye Other than Black>

The black film according to the present disclosure is composed of the thermoplastic resin (A). The thermoplastic resin (A) includes two or more types of dyes other than black. In other words, the thermoplastic resin (A) includes at least a dye (C1) other than black and a dye (C2) other than black. The at least two types of dyes are selected such that they together absorb light in the entire visible light range and produce a deep and clear black color. Specifically, the respective dyes having a maximum absorptive wavelength in a visible light range (380 to 780 nm) in a range of from 380 to 670 nm and a range of from 670 to 780 nm are selected. Thus, in a L*a*b* color system measurement, a black color that has L* (lightness) of no more than 10, an absolute value of a* of no more than 2.0, and an absolute value of b* of no more than 2.0 can be produced. More preferably, selecting the respective dyes having a maximum absorptive wavelength in the visible light range (380 to 780 nm) in a range of from 500 to 670 nm and a range of from 670 to 780 nm makes it possible to produce a greenish black color and to provide a sense of luxuriousness. Furthermore, the use of three or more types of dyes allows for more easily absorbing light in the entire visible light range, a deep and clear black color can be produced. Specifically, selecting the respective dyes having a maximum absorptive wavelength in the visible light range (380 to 780 nm) in a range of from 380 to 600 nm, a range of from 600 to 670 nm, and a range of from 670 to 780 nm makes it possible to produce a black color. The maximum absorptive wavelength of the dye can be determined by measuring a 10-mg/L dichloromethane solution of the dye.

The types of the dyes are not particularly limited, and well-known dyes can be used. Examples of suitable dyes include anthraquinones, azos, anthrapyridones, perylenes, anthracenes, perinones, indanthrones, quinacridones, xanthenes, thioxanthenes, oxazines, oxazolines, indigoids, thioindigoids, quinophthalones, naphthalimides, cyanines, methines, pyrazolones, lactones, coumarins, bis-benzoxazolylthiophenes, naphthalenetetracarboxylic acids, phthalocyanines, triarylmethanes, aminoketones, bis(styryl)biphenyls, azines, rhodamines, derivatives of the foregoing compounds, and mixtures of the above. Perinones, perylenes, azos, methines, and quinolines are preferable, and anthraquinones are more preferable for their high heat resistance and broad optical absorption band in a long wavelength range and from the viewpoint of weatherability. In particular, a mixture of anthraquinones and perinones is preferable.

Examples of the anthraquinones include those that are commercially available under the color indices of Solvent Red 52, Solvent Red 111, Solvent Red 149, Solvent Red 150, Solvent Red 151, Solvent Red 168, Solvent Red 191, Solvent Red 207, Disperse Red 22, Disperse Red 60, Disperse Violet 31, Solvent Blue 35, Solvent Blue 36, Solvent Blue 63, Solvent Blue 78, Solvent Blue 83, Solvent Blue 87, Solvent Blue 94, Solvent Blue 97, Solvent Green 3, Solvent Green 20, Solvent Green 28, Disperse Violet 28, Solvent Violet 13, Solvent Violet 14, Solvent Violet 36, and so on.

Examples of the perinones include those that are commercially available under the color indices of Solvent Orange 60, Solvent Orange 78, Solvent Orange 90, Solvent Violet 29, Solvent Red 135, Solvent Red 162, Solvent Red 179, and so on.

Examples of the perylenes include dyes that are commercially available under the color indices of Solvent Green 3, Solvent Green 5, Solvent Orange 55, Vat Red 15, Vat Orange 7, FOrange 240, FRed 305, FRed 339, FYellow 83, and so on.

Examples of the azos include those that are commercially available under the color indices of Solvent Yellow 14, Solvent Yellow 16, Solvent Yellow 21, Solvent Yellow 61, Solvent Yellow 81, Solvent Red 23, Solvent Red 24, Solvent Red 27, Solvent Red 8, Solvent Red 83, Solvent Red 84, Solvent Red 121, Solvent Red 132, Solvent Violet 21, Solvent Black 21, Solvent Black 23, Solvent Black 27, Solvent Black 28, Solvent Black 31, Solvent Orange 37, Solvent Orange 40, Solvent Orange 45, and so on.

Examples of the methines include those that are commercially available under the color indices of Solvent Orange 80, Solvent Yellow 93, and so on.

Examples of the quinolines include those that are commercially available under the color indices of Solvent Yellow 33, Solvent Yellow 98, Solvent Yellow 157, Disperse Yellow 54, Disperse Yellow 160, and so on.

The total concentration C of the dyes other than black in the thermoplastic resin (A) is 0.4 to 5.0 mass %. When the total concentration C of the dyes other than black is no less than 0.4 mass %, the black film, when used in decorative applications, does not yield a color tone difference among identical decorative molded products even after being stretch-molded and excels in deep and clear coal-blackness. When the total concentration C of the dyes other than black is no more than 5.0 mass %, the cost can be reduced by reducing the amount of dyes being used, and the compatibility of the dyes and the polymer is retained high to allow for suppressing an occurrence of a bleed out of the dyes.

The thermoplastic resin (A) may contain other additives within a range that does not depart from the spirit of the present disclosure. For example, the thermoplastic resin (A) may contain an antioxidant, a stabilizer, an ultraviolet absorber, a lubricant, a processing aid, an antistatic agent, an impact resistance aid, a foaming agent, a filler, a delustering agent, or the like. The content of the other additives is preferably no more than 10 mass %. Those ultraviolet absorbers described later can be used.

From the viewpoint of preventing the black film from having a whitish hue or from having a grainy defect, it is preferable that the content of, in particular, pigment in the thermoplastic resin (A) be no more than 2 mass %, and it is more preferable that the thermoplastic resin (A) contain no pigment.

<Black Film>

The black film according to the present disclosure has a thickness T of 45 to 550 μm. When the thickness is less than 45 μm, the black film results in being see-through after being stretch-molded. When such a black film is used in decorative applications, a color tone difference is more likely to occur among identical decorative molded products, and it also becomes difficult to express a deep color tone. When the thickness is greater than 550 μm, the thickness of the overall film increases, which may lead to problems in ease of handling, ease of cutting, ease of stamping, or the like. In addition, the increase in the thickness of the overall film may reduce the following performance of the film at an end portion of a decorative molded product when insert molding or vacuum forming is carried out. On the basis of the reasons described above, the lower limit of the thickness of the black film is more preferably 50 μm or even more preferably 100 μm, and the upper limit of the thickness is more preferably no more than 450 μm or even more preferably no more than 400 μm The black film according to the present disclosure satisfies the following expression (1).

$$C \times T \geq 210 \qquad (1)$$

In the above, C denotes the total concentration [mass %] of the dyes other than black in the thermoplastic resin (A), and T denotes the thickness [μm] of the black film. As the black film satisfies the expression (1), the black film can have a total light transmittance held after being stretched twofold in one axial direction at a temperature higher by 20° C. than its glass transition temperature of no more than 3.0% or preferably no more than 2.0%, and the black film does not result in being see-through even after being stretch-molded and excels in deep and clear coal-blackness. Therefore, suitably, molding at a high stretching rate is possible, and thus the black film is suitable, in particular, for deep-draw forming or the like. In addition, when the black film is used in decorative molded products, a color tone difference does not occur among identical decorative molded products, and the black film excels in deep and clear coal-blackness. The value of C×T in the left-hand side of the expression (1) is no less than 210, preferably 220 to 1000, more preferably 230 to 850, or even more preferably 240 to 700.

The black film according to the present disclosure has L* (lightness) of no more than 10, an absolute value of a* of no more than 2.0, and an absolute value of b* of no more than 2.0 in the L*a*b* color system measurement compliant with JIS Z 8781-4. When these values are in the stated ranges, the film is black and excels in coal-blackness.

The black film according to the present disclosure may be a monolayer film consisting of the layer composed of the thermoplastic resin (A) described above. The black film according to the present disclosure may be a film having another layer in addition to the layer composed of the thermoplastic resin (A) described above (hereinafter, may also be referred to as a black layer). In other words, the black film according to the present disclosure may be a laminate film having two or more layers.

<Surface Protection Layer>

The black film according to the present disclosure can be a film having a black layer and a surface protection layer composed of a transparent thermoplastic resin (B) (hereinafter, may also be referred to as a laminate film). For the surface protection layer, a well-known transparent thermoplastic resin (B) can be used within a range that does not depart from the spirit of the present disclosure. As the laminate film is provided with the surface protection layer, the laminate film excels in scratch resistance.

Suitable examples of the transparent thermoplastic resin (B) can include methacrylic resin, polyvinylidene fluoride, styrene-based resin, polycarbonate resin, polyolefin, norbornene-based polymer, cycloolefin-based polymer, and polyester resin. Among the above, methacrylic resin is preferable as it provides excellence in weatherability, transparency, and surface hardness of the laminate film.

The type of the methacrylic resin is not particularly limited, and those similar to the ones described above in relation to the thermoplastic resin (A) can be used. The transparent thermoplastic resin (B) is preferably a methacrylic resin that includes no less than 60 mass % of a (meth)acryl-based polymer. In the transparent thermoplastic resin (B), the content of a structural unit derived from an acrylic acid alkyl ester having a carbon number of 6 to 12 is preferably 2.5 to 25 mass %.

The total light transmittance of the transparent thermoplastic resin (B) held when the transparent thermoplastic resin (B) is press-formed into a sheet having a thickness of 3 mm is preferably no less than 70%, more preferably no less than 80%, or even more preferably no less than 85%.

The transparent thermoplastic resin (B) may contain an additive within a range that does not depart from the spirit of the present disclosure. For example, the transparent thermoplastic resin (B) may contain an antioxidant, a stabilizer, an ultraviolet absorber, a light stabilizer, a lubricant, a processing aid, an antistatic agent, a colorant, an impact resistance aid, a foaming agent, a filler, a delustering agent, or the like.

From the viewpoint of providing the surface protection layer with weatherability, the transparent thermoplastic resin (B) may contain an ultraviolet absorber. An ultraviolet absorber is a compound that has an ability to absorb ultraviolet radiation and is a compound that has a function of converting primarily optical energy to heat energy. Examples of the ultraviolet absorber include benzophenones, benzotriazoles, triazines, benzoates, salicylates, cyanoacrylates, oxalic anilides, malonic esters, and formamidines. Among the above, benzotriazoles and triazines are preferable. One of the ultraviolet absorbers alone or a combination of two or more of the ultraviolet absorbers can be used.

Examples of the benzotriazoles include 2,2'-methylenebis[4-(1,1,3,3-tetramethylbutyl)-6-(2H-benzotriazole-yl)phenol] (manufactured by Asahi Denka Co., Ltd. under the product name of ADK STAB LA-31), 2-(2H-benzotriazol-2-yl)-4-(1,1,3,3-tetramethylbutyl)phenol (manufactured by Ciba Specialty Chemicals under the product name of TINUVIN 329), and 2-(2H-benzotriazol-2-yl)-4,6-bis(1-methyl-1-phenylethyl)phenol (manufactured by Ciba Specialty Chemicals under the product name of TINUVIN 234). Examples of the triazines include one with the product name of TINUVIN 479 manufactured by Toyotsu Chemiplas Corporation. Among these ultraviolet absorbers, the triazines are used preferably from the viewpoint of suppressing resin deterioration caused by ultraviolet irradiation.

In order to further improve the weatherability of the surface protection layer, the transparent thermoplastic resin (B) may contain a weatherability improver such as a light stabilizer. Preferable examples of the light stabilizer include a hindered amine-based light stabilizer (HALS). Preferable examples of the hindered amine-based light stabilizer include bis(1,2,2,6,6-pentamethyl-4-piperidyl)sebacate (Manufactured by BASF Corporation under the product name of "TINUVIN 292"), decanedioic acid bis(2,2,6,6-tetramethyl-1-(octyloxy)-4-piperidinyl)ester (Manufactured by BASF Corporation under the product name of "TINUVIN 123"), bis(1,2,2,6,6-pentamethyl-4-piperidinyl)sebacate, methyl(1,2,2,6,6-pentamethyl-4-piperidinyl)sebacate, and 2,4-bis[N-butyl-N-(1-cyclohexyloxy-2,2,6,6-tetramethylpiperidin-4-yl)amino]-6-(2-hydroxyethylamine)-1,3,5-triazine).

The thickness of the surface protection layer may vary depending on the intended use or the need but is preferably 10 to 250 μm. When the thickness is less than 10 μm, the weatherability, the transparency, and the surface hardness may become insufficient. In addition, as the thickness of the surface protection layer is reduced, the effect of adding the ultraviolet absorber is reduced, and the weatherability decreases. To address this issue, a conceivable method is to increase the concentration of the ultraviolet absorber. However, since the ultraviolet absorber typically has a low molecular weight, the ultraviolet absorber has low compatibility with resin and tends to bleed out onto a surface of the surface protection layer while being used for an extended period of time. The bleed out appears more prominently as the concentration of the added ultraviolet absorber is higher, and thus there is a limitation on the concentration of the added ultraviolet absorber. When the thickness of the surface protection layer is greater than 250 μm, the thickness of the overall film increases, which may lead to problems in ease of handling, ease of cutting, ease of stamping, fracture resistance, or the like. The lower limit of the thickness of the surface protection layer is more preferably 30 μm or even more preferably 40 μm, and the upper limit of the thickness of the surface protection layer is more preferably 150 μm or even more preferably 100 μm.

<Adhesive Resin Layer>

The black layer according to the present disclosure can be a layered product having a black layer and an adhesive resin layer. The adhesive resin layer is a layer that makes contact with a base material, described later, when vacuum forming is carried out, and plays a role of favorably retaining the adhesiveness between the black layer and the base material. In the present disclosure, the adhesive resin layer includes an adhesive bonding resin and/or an adhesive resin.

The adhesive bonding resin has moderate viscoelasticity before being cured and thus allows for pressure-bonding onto an adherend with a small pressure and can exhibit high cohesion without undergoing a reaction at a high temperature and for an extended period of time. Therefore, forming the adhesive resin layer with the use of the adhesive bonding resin makes it possible to exhibit high adhesive strength when a decorative molded product is manufactured through vacuum forming and to obtain a laminate film that excels in adhesive strength.

For the adhesive bonding resin, a well-known adhesive bonding resin, such as aliphatic polyamide, dimer acid modified epoxy resin and/or NBR modified epoxy resin, or epoxy-based resin, can be used.

For the adhesive resin, a well-known adhesive resin, such as acryl-based adhesive resin, can be used. The acryl-based adhesive resin may contain a cross-linker, as necessary.

The thickness of the adhesive resin layer is preferably 5 to 100 μm or more preferably 10 to 50 μm. When the thickness of the adhesive resin layer is within the stated range, sufficient adhesive strength can be retained when a decorative molded product is manufactured through vacuum forming.

<Binder Layer>

The black layer according to the present disclosure can be a layered product having a black layer and a binder layer. The binder layer is a layer that makes contact with resin injected when insert molding is carried out (hereinafter, simply referred to as "injection resin"), and plays a role of favorably retaining the adhesiveness by being present between the black layer and the injection resin. In the present disclosure, the binder layer is composed of a binder resin. It is preferable that no less than 60 mass % of the binder resin be composed of a structural unit derived from a monomer that is common to the binder resin and the injection resin. The structural unit derived from a monomer that is common to the binder resin and the injection resin is contained in preferably no less than 70 mass %, more preferably no less than 80 mass %, or particularly preferably no less than 90 mass % in each of the resins.

There is no particular limitation on the binder resin and the injection resin as long as satisfying the above-described conditions and unless departing from the spirit of the present disclosure. A suitable resin can be one that includes polycarbonate resin, styrene-based polymer, or a mixture thereof. The polycarbonate resin and the styrene-based polymer that can be used are those similar to the ones described above in relation to the thermoplastic resin (A).

The thickness of the binder layer is preferably 5 to 500 μm, more preferably 25 to 450 μm, or even more preferably 50 to 400 μm. When the thickness of the binder layer is within the stated range, sufficient adhesive strength can be retained when a decorative molded product is manufactured through insert molding.

<Laminate Film>

The total thickness of the laminate film is 45 to 550 μm. The laminate film has L* (lightness) of no more than 10, an absolute value of a* of no more than 2.0, and an absolute value of b* of no more than 2.0 in the L*a*b* color system measurement compliant with JIS Z 8781-4, as measured from the surface protection layer side. It is preferable that the laminate film have a total light transmittance held after being stretching twofold in one axial direction at a temperature higher by 20° C. than the glass transition temperature of the one with a higher glass transition temperature of the thermoplastic resins included in the respective layers constituting the laminate film of no more than 3.0% or preferably no more than 2.0%.

<Method of Manufacturing Black Film>

The black film according to the present disclosure can be manufactured through a well-known manufacturing method within a range that does not depart from the spirit, such as press molding, extrusion molding, or injection molding. A suitable example can be extrusion molding. In particular, when the laminate film is to be extrusion-molded, the laminate film can be manufactured through coextrusion molding. The use of coextrusion molding increases the productivity and allows for obtaining excellent inter-layer adhesiveness.

When the laminate film is to be coextrusion-molded, the resins composing the respective layers are each thermally molten, supplied to extrusion dies from respective extruders, pumps, or the like through different flow channels, extruded in multiple layers from the extrusion dies, and then bonded together. Examples of the extrusion die that can be used include a T-die, such as a multi-manifold die or a feed block.

In the case of the feed block system, the resin formed into multiple layers by the feed block is guided to a sheet molding die, such as a T-die, and molded into a film shape. Then, the resin enters into a gap between a pair of pressing rolls, passes through the gap between the pressing rolls, and is cooled, and thus a laminate film is obtained. Meanwhile, in the case of the multi-manifold system, the resin formed into multiple layers within the multi-manifold die is molded into a film shape inside the die in a similar manner. Thereafter, the resin enters into a gap between a pair of pressing rolls, passes through the gap between the pressing rolls, and is cooled, and thus a laminate film is obtained. From the viewpoint of favorably retaining the uniformity of the thickness of each layer, the multi-manifold die is preferable.

In manufacturing the black film according to the present disclosure, extrusion molding can be carried out through a polymer filter. Any method that includes a process of allowing each resin to pass through a polymer filter in a molten state may be used, and a well-known method can be used. As the polymer filter, a leaf-type polymer filter or a pleated polymer filter is preferable, and a pleated polymer filter is particularly preferable. A polymer filter with a sieve opening of 5 to 40 μm is preferable. In extrusion molding, the polymer filter can be disposed, for example, between an extruder and a die or between an extruder and a gear pump.

<Base Material>

A base material according to the present disclosure is an adherend for the black film according to the present disclosure. It suffices that the base material can have the black film according to the present disclosure affixed thereon through vacuum forming or insert molding. For example, the base material is a plate, such as a planar plate or a curved plate, of various materials, a three-dimensional article, a sheet (or a film), or the like. Examples of such various materials include a wood fiberboard, such as a veneer board, a plywood board, a particle board, or an MDF (mid-density fiberboard); a metal material, such as iron or aluminum; ceramics such as glass or pottery; a non-cement ceramic material, such as gypsum; a non-pottery ceramic material, such as an ALC (autoclaved lightweight concrete) plate; a resin material such as acryl-based resin, polyester-based resin, polystyrene-based resin, polyolefin-based resin including polypropylene, acrylonitrile-butadiene-styrene copolymer resin (ABS resin), polycarbonate-based resin, phenol-based resin, vinyl chloride-based resin, cellulose-based resin, or rubber.

<Decorative Molded Product>

According to an aspect of the present disclosure, the decorative molded product is a three-dimensional molded product in which at least a portion of a surface of the base material is covered by the black film according to the present disclosure through vacuum forming. Specifically, FIG. 1 illustrates a schematic sectional view of an example of the decorative molded product according to the present disclosure. In a decorative molded product 10 illustrated in FIG. 1, an adhesive resin layer 3 is formed on a base material 4, a black layer 1 is formed on the adhesive resin layer 3, and a surface protection layer 2 is formed on the black layer 1.

Figure 2:
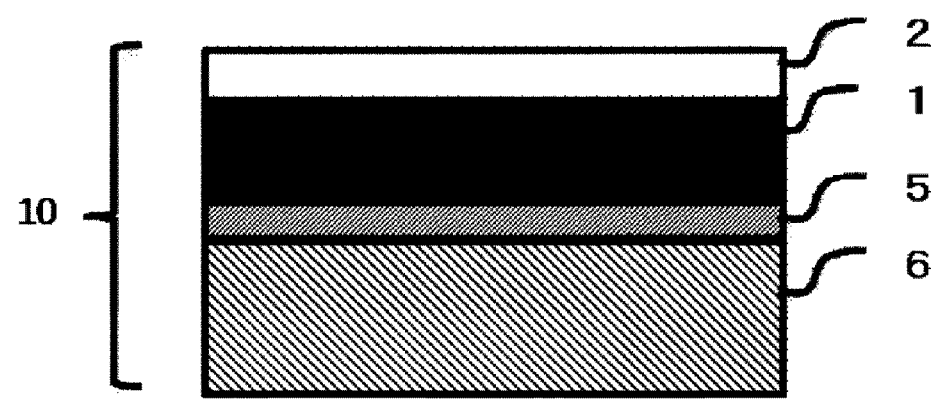
FIG. 2 is a schematic sectional view illustrating another example of a decorative molded product manufactured through insert molding with the use of a black film according to the present disclosure.

According to another aspect of the present disclosure, the decorative molded product is a three-dimensional molded product in which at least a portion of a surface of the injection resin is covered by the black film according to the present disclosure through insert molding. Specifically, FIG. 2 illustrates a schematic sectional view of an example of the decorative molded product according to the present disclosure. In a decorative molded product 10 illustrated in FIG. 2, a binder layer 5 is formed on a layer composed of an injection resin 6, a black layer 1 is formed on the binder layer 5, and a surface protection layer 2 is formed on the black layer 1. In this case, the layer composed of the injection resin 6 is the base material.

The black film according to the present disclosure does not result in being see-through even after being stretch-molded and excels in deep and clear coal-blackness. In addition, the decorative molded product according to the present disclosure excels in deep and clear coal-blackness. On the basis of these characteristics, the black film or the decorative molded product according to the present disclosure is suitable for decorative applications and can be used in molded products requiring design sophistication or in various molded products requiring light-blocking characteristics. Specifically, the black film or the decorative molded product is suitably used for signboard components including an advertising pillar, a stand signboard, a side signboard, a transom signboard, and a rooftop signboard; display components including a showcase, a divider panel, and a store display; illumination components including a fluorescent lamp cover, a mood lighting cover, a lamp shade, a luminous ceiling, a luminous wall, and a chandelier; interior design components including furniture, a pendant, and a mirror; construction components including a door, a dome, safety window glass, a partition, a staircase wainscot, a balcony wainscot, and a roof of a leisure building; transportation-related components including an airplane windshield, a pilot visor, a windshield for a motorcycle or a motorboat, a sun visor for a bus, a side visor for an automobile, a rear visor for an automobile, a head wing for an automobile, a headlight cover for an automobile, an automobile interior member, and an automobile exterior member such as a bumper and a mold; electronics components including a nameplate for an audiovisual system, a stereo cover, a protective mask for a television set, a vending machine, a cellular phone, and a personal computer; medical device-related components including an incubator and an X-ray component; device-related components including a machine cover, an instrument cover, an experimental device, a ruler, a dial, and an observation window; traffic-related components including a road sign, a direction board, a convex traffic mirror, and a noise barrier; as well as a greenhouse, a large-sized tank, a box water tank, a bathroom member, a clock panel, a bath tub, a sanitary, a desk mat, a gaming machine component, a toy, a decorative and protective film on the surface of a face protection mask to be worn when welding or the like, and a wallpaper; a marking film; and so on.

<Method of Manufacturing Decorative Molded Product>

The decorative molded product according to the present disclosure is obtained through a process in which the black film is affixed, through vacuum forming, onto a surface of the base material with the adhesive resin layer interposed therebetween or a process in which the black film is bonded, through insert molding, to a surface of the injection resin with the binder layer interposed therebetween.

In the vacuum forming, the TOM (Three Dimension Overlay Method) is preferably used. In the TOM, for example, the air in the two spaces, within a device, separated by a black film fixed to a fixing frame is sucked by a vacuum pump or the like to create a vacuum within the device. At the same time, the film is heated with an infrared heater until the temperature of the film reaches a predetermined temperature at which the film softens, and only one of the two spaces within the device is fed with air at a timing at which the film has been heated and softened. Thus, the film is tightly bonded to the base material serving as an adherend to fit its three-dimensional shape under a vacuum atmosphere. After the film has been tightly bonded to the base material, the film is removed from the fixing frame to obtain a decorative molded product. The vacuum forming is carried out typically by heating the film such that the surface temperature thereof is 80° C. to 150° C. or preferably approximately 110° C. to 140° C.

In one insert molding technique, for example, a black film that has been preformed through vacuum forming or the like in advance is fixed to a mold, and resin is injected from the binder layer side of the black film. The temperature of the injection resin is typically 150° C. to 300° C. or preferably 180° C. to 280° C., depending on the melt viscosity of the resin to be used.

EXAMPLES

Hereinafter, the present disclosure will be described in more concrete terms by illustrating examples and comparative examples. It is to be noted that the present disclosure is not limited by the following examples. In addition, the present disclosure encompasses all the aspects formed by combining, as desired, the matters expressing the technical features such as characteristic values, modes, manufacturing methods, and applications described thus far.

The physical property values in the examples and the comparative examples were measured through the following methods.

[Glass Transition Temperature]

With resin obtained in each manufacturing example, the DSC curve was measured with the use of a differential scanning calorimetry in accordance with JIS K7121 under the following conditions. Specifically, the temperature of the resin was raised a first time to 230° C. at 10° C. per minute, the resin was then cooled to a room temperature (25° C.), and the temperature of the resin was raised a second time from the room temperature to 230° C. at 10° C. per minute. The intermediate glass transition temperature obtained from the DSC curve measured when the temperature was raised the second time served as the glass transition temperature according to the present disclosure.

Device: differential scanning calorimeter (Q20) manufactured by TA Instruments

[Measurement of Maximum Absorptive Wavelength of Dye]

A 10-mg/L dichloromethane solution of each dye was prepared, and a transmission measurement was carried out with the use of an ultraviolet-visible-near-infrared spectrophotometer. The wavelength within the visible light range (380 to 780 nm) at which the absorbance was the highest served as the maximum absorptive wavelength of the dye.

Device: ultraviolet-visible-near-infrared spectrophotometer (UV-3600) manufactured by Shimadzu Corporation

[Coal-Blackness]

The black film obtained in each of the examples (hereinafter, may also be referred to simply as a "film") was cut out into a piece measuring 50 mm on each side, and this piece was fixed with a double-sided adhesive tape onto an acrylic plate measuring 100 mm on each side and has a thickness of 3 mm. This served as a test piece. The test piece was set in the spectrophotometer with the film side, or in particular the surface protection layer side if the surface protection layer was provided, serving as a measurement surface, and the measurement was carried out with an A light source, at a viewing angle of 2°, and in a reflection mode (diffuse reflection) in accordance with JIS Z8722. Thereafter, the values of $L^*$, $a^*$, and $b^*$ were obtained in the $L^*a^*b^*$ color system (JIS Z 8781-4). As the values of $L^*$, $a^*$, and $b^*$ are smaller, the color tone becomes darker, and the coal-blackness increases.

Device: spectrophotometer (UV-3600) manufactured by Shimadzu Corporation

[Twofold Stretching in One Axial Direction]

The film obtained in each of the examples was cut out into a piece measuring 50 mm by 150 mm, and this served as a test piece. The test piece was set in an autograph, and this test piece was stretched until the inter-chuck distance became 220 mm at a load cell of 5 kN, with an inter-chuck distance of 110 mm, and at a tensile rate of 300 mm/min in a temperature atmosphere that was higher by 20° C. than the glass transition temperature of the thermoplastic resin with the highest glass transition temperature among the thermoplastic resins included in the respective layers constituting the film. Thus, a test piece that was stretched twofold in one axial direction was fabricated.

Device: autograph (AG-5 kN) manufactured by Shimadzu Corporation

[Total Light Transmittance]

The thickness of the test piece that had been stretched twofold in one axial direction obtained through the method described above was measured. The portion of the test piece in which the thickness after stretching had become a half the thickness held before stretching was set in the spectrophotometer with the surface protection layer side, if the surface protection layer is provided, serving as a measurement surface, and the measurement was carried out with an A light source, at a viewing angle of 2°, and in a reflection mode (diffuse reflection) in accordance with JIS Z8722.

[Application of Adhesive Resin Layer]

In the film obtained in each of the examples, the black layer side, when the surface protection layer is present, was coated with an acryl-based adhesive T, described later, such that the thickness to be obtained after drying would become 60 μm and this was then dried. Thereafter, the film was processed in a vacuum dryer at 80° C. and for 10 minutes, and thus a film provided with an adhesive resin layer was obtained.

[Fabrication of Decorative Molded Product]

The laminate film provided with the adhesive resin layer was cut out into a piece measuring 300 mm by 210 mm, and this served as a test piece. The test piece was set in a vacuum air-pressure molding machine such that the adhesive resin layer side of the test piece would make contact with the upper surface of the base material (one having a rectangular parallelepiped shape measuring 800 mm by 120 mm by 25 mm in height and having an upper surface (one of the surfaces each measuring 80 mm by 120 mm) with rounded corners) after molding. The base material used was composed of an ABS/polycarbonate alloy. The test piece and the molded product were tightly bonded to each other when the surface temperature of the test piece was brought to 130° C. by a far-infrared heater, and TOM molding was carried out to obtain a decorative molded product.

Device: vacuum air-pressure molding machine NGF manufactured by Fu-se Vacuum Forming Ltd.

[Check on See-Through State in Decorative Molded Product]

The decorative molded product fabricated through the method described above and an unstretched film that was not coated with an adhesive resin layer were placed side by side, and the difference in coal-blackness was visually observed under a fluorescent light environment within a room and evaluated by the following criteria. For the decorative molded product, the film side was observed. When the surface protection layer was present, the visual observation was carried out from the surface protection layer side. The criterion of A indicates that the black film does not allow seeing therethrough even when the black film is processed at a high stretching rate and excels in deep and clear coal-blackness.

A: No color tone difference occurred among the decorative molded products (the black film provided depth and clarity equivalent to those of the unstretched black film).

B: A color tone difference occurred among the decorative molded products (the black film did not provide depth and clarity equivalent to those of the unstretched black film).

In the manufacturing examples and the examples described later, the following materials were used.

<Methacrylic Resin (X)>

Methacrylic Resin (X-1): A methyl methacrylate polymer including 6.0 mass % of a structural unit derived from methyl acrylate and having a viscosity-average degree of polymerization of 1550.

Methacrylic Resin (X-2): A methyl methacrylate polymer including 2.5 mass % of a structural unit derived from methyl acrylate and having a viscosity-average degree of polymerization of 1170.

<Multilayer Structure Rubber Particle (Y)>

The multilayer structure rubber particle (Y) is a multilayer structure rubber particle having a three-layer structure constituted by an innermost layer (y-1), an intermediate layer (y-2), and an outermost layer (y-3) and having a particle size observed with an electron microscope of 0.23 μm. The innermost layer (y-1) includes 93.84 parts by mass of a structural unit derived from methyl methacrylate, 5.96 parts by mass of a structural unit derived from methyl acrylate, and 0.20 parts by mass of a structural unit derived from allyl methacrylate, which is a cross-linkable monomer. The mass of the layer (y-1) is 34.73 parts by mass with respect to 100 parts by mass in total of the layer (y-1), the layer (y-2), and the layer (y-3). The intermediate layer (y-2) includes 80.61 parts by mass of a structural unit derived from butyl acrylate, 17.43 parts by mass of a structural unit derived from styrene, and 1.96 parts by mass of a structural unit derived from allyl methacrylate, which is a cross-linkable monomer. The mass of the layer (y-2) is 45.46 parts by mass with respect to 100 parts by mass in total of the layer (y-1), the layer (y-2), and the layer (y-3). The outermost layer (y-3) includes 94.00 parts by mass of a structural unit derived from methyl methacrylate and 6.00 parts by mass of a structural unit derived from methyl acrylate. The mass of the layer (y-3) is 19.81 parts by mass with respect to 100 parts by mass in total of the layer (y-1), the layer (y-2), and the layer (y-3).

<Block Copolymer (Z)>

The block copolymer (Z) is a diblock copolymer composed of a polymer block [z1] consisting of a structural unit derived from methyl methacrylate and a polymer block [z2] composed of 74.4 mass % of a structural unit derived from butyl acrylate and 25.6 mass % of a structural unit derived from benzyl acrylate, and the diblock copolymer has a weight-average molecular weight of 90,000 and a polymer block mass ratio [z1]:[z2] of 1:1.

<Dye>

Solvent Green 28 (manufactured by LANXESS) maximum absorptive wavelength: 685 nm Solvent Green 3 (manufactured by LANXESS) maximum absorptive wavelength: 643 nm Solvent Violet 36 (manufactured by LANXESS) maximum absorptive wavelength: 555 nm <Carbon Black>

Mitsubishi Carbon Black #1000 (manufactured by Mitsubishi Chemical Corporation)

<Polycarbonate Resin>

Polycarbonate resin ("300 series" manufactured by Sumika Styron Polycarbonate Ltd.)

<ABS Resin>

ABS resin ("SANTAC" manufactured by Nippon A&L Inc.)

Manufacturing Example 1

[Preparation of Organic Dye-Containing Resin (P-1)]

The following materials were melt-compounded, and an organic dye-containing resin (P-1), which was a black acrylic resin, was obtained.
methacrylic resin (X-1): 70.64 mass %
multilayer structure rubber particle (Y): 27.66 mass %
Solvent Green 28: 0.50 mass %
Solvent Green 3: 0.90 mass %
Solvent Violet 36: 0.30 mass %

In the organic dye-containing resin (P-1), the content of a structural unit derived from an acrylic acid alkyl ester having a carbon number of 6 to 12 was 10.14 mass %.

Manufacturing Examples 2 to 11

[Preparation of Organic Dye-Containing Resins (P-2) to (P11)]

Organic dye-containing resins (P-2) to (P-8) and (P-11), which were black acrylic resins, an organic dye-containing resin (P-9), which was a black polycarbonate resin, and an organic dye-containing resin (P-10), which was a black ABS resin, were obtained in a similar manner to that in Manufacturing Example 1 except that the source materials and the mixing ratios were changed in accordance with Table 1.

Manufacturing Example 12

[Preparation of Acrylic Resin (Q)]

The following materials were melt-compounded, and a transparent acrylic resin (Q) was obtained.
methacrylic resin (X-2): 79.20 mass %
block copolymer (Z): 19.80 mass %
TINUVIN 479 (manufactured by Toyotsu Chemiplas Corporation): 1.0 mass %

Manufacturing Example 13

[Preparation of Acrylic Resin (R)]

The following materials were melt-compounded, and a transparent acrylic resin (R) was obtained.
methacrylic resin (X-1): 71.14 mass %
multilayer structure rubber particle (Y): 27.86 mass %
TINUVIN 479 (manufactured by Toyotsu Chemiplas Corporation): 1.0 mass %

Manufacturing Example 14

[Preparation of Polyvinylidene Fluoride/Methacrylic Resin Alloy (S)]

The following materials were melt-compounded, and a transparent acrylic resin (S) was obtained.
polyvinylidene fluoride ("Kynar" manufactured by ARKEMA): 69.30 mass %
methacrylic resin (X-1): 29.70 mass %
TINUVIN 479 (manufactured by Toyotsu Chemiplas Corporation): 1.0 mass %

TABLE 1

|  |  | Dye Pigment | | | | | | | |
|---|---|---|---|---|---|---|---|---|---|
|  |  | Solvent Green 28 | Solvent Green 3 | Solvent Violet 36 | Carbon Black | Conc | Ultraviolet Absorber | Methacrylic Resin (X-1) | Methacrylic Resin (X-2) |
| Manufacturing Example 1 | P-1 | 0.50 | 0.90 | 0.30 |  | 1.70 |  | 70.64 |  |
| Manufacturing Example 2 | P-2 | 0.50 | 1.20 |  |  | 1.70 |  | 70.64 |  |
| Manufacturing Example 3 | P-3 | 0.12 | 0.21 | 0.07 |  | 0.40 |  | 71.58 |  |
| Manufacturing Example 4 | P-4 | 1.47 | 2.65 | 0.88 |  | 5.00 |  | 68.27 |  |
| Manufacturing Example 5 | P-5 | 0.25 | 0.45 | 0.15 |  | 0.85 |  | 71.25 |  |
| Manufacturing Example 6 | P-6 | 0.09 | 0.16 | 0.05 |  | 0.30 |  | 71.64 |  |
| Manufacturing Example 7 | P-7 |  |  | 1.70 |  | 1.70 |  | 70.64 |  |
| Manufacturing Example 8 | P-8 |  |  |  | 1.70 | 1.70 |  | 70.64 |  |
| Manufacturing Example 9 | P-9 | 0.50 | 0.90 | 0.30 |  | 1.70 |  |  |  |
| Manufacturing Example 10 | P-10 | 0.50 | 0.90 | 0.30 |  | 1.70 |  |  |  |

TABLE 1-continued

| | | | | | | | | |
|---|---|---|---|---|---|---|---|---|
| Manufacturing Example 11 | P-11 | 0.50 | 0.90 | 0.30 | 1.70 | | 98.30 | |
| Manufacturing Example 12 | Q | | | | 0.00 | 1.00 | | 79.20 |
| Manufacturing Example 13 | R | | | | 0.00 | 1.00 | 71.14 | |
| Manufacturing Example 14 | S | | | | 0.00 | 1.00 | 29.73 | |

| | | Multilayer Structure Rubber Particle (Y) | Block Copolymer (Z) | Polycarbonate Resin | ABS Resin | PVDF Resin | Content of a structural unit derived from an acrylic acid alkyl ester having a carbon number of 6 to 12 |
|---|---|---|---|---|---|---|---|
| Manufacturing Example 1 | P-1 | 27.66 | | | | | 10.14 |
| Manufacturing Example 2 | P-2 | 27.66 | | | | | 10.14 |
| Manufacturing Example 3 | P-3 | 28.02 | | | | | 10.27 |
| Manufacturing Example 4 | P-4 | 26.73 | | | | | 9.80 |
| Manufacturing Example 5 | P-5 | 27.90 | | | | | 10.22 |
| Manufacturing Example 6 | P-6 | 28.06 | | | | | 10.28 |
| Manufacturing Example 7 | P-7 | 27.66 | | | | | 10.14 |
| Manufacturing Example 8 | P-8 | 27.66 | | | | | 10.14 |
| Manufacturing Example 9 | P-9 | | | 98.30 | | | 0.00 |
| Manufacturing Example 10 | P-10 | | | | 98.30 | | 0.00 |
| Manufacturing Example 11 | P-11 | | | | | | 0.00 |
| Manufacturing Example 12 | Q | | 19.80 | | | | 7.37 |
| Manufacturing Example 13 | R | 27.86 | | | | | 10.21 |
| Manufacturing Example 14 | S | | | | | 69.30 | 0.00 | unit: mass %

Manufacturing Example 15

[Preparation of Acryl-Based Adhesive (T) for Adhesive Resin Layer]

A reaction vessel (provided with a temperature controller, a stirrer, and a refluxer) under a nitrogen atmosphere was charged with 65 parts by mass of butyl acrylate, 30 parts by mass of methyl acrylate, and 5 parts by mass of 2-hydroxyethyl acrylate, and 200 parts by mass of ethyl acetate and 0.1 parts by mass of azobisisobutyronitrile were added thereto. This mixture was subjected to a polymerization reaction at 75° C. for 10 hours to obtain a polymer T1. The weight-average molecular weight (Mw) of the obtained polymer T1, measured through GPC, was 800,000.

Next, a reaction vessel under a nitrogen atmosphere was charged with 90 parts by mass of methyl methacrylate and 10 parts by mass of dimethylaminoethyl methacrylate, and 200 parts by mass of ethyl acetate and 2 parts by mass of azobisisobutyronitrile were added thereto. This mixture was subjected to polymerization at 75° C. for 10 hours to obtain a polymer T2. The molecular weight (Mw) of the polymer T2 was measured similarly to the case of the polymer T1. The weight-average molecular weight (Mw) of the polymer T2 was 10,000.

The obtained polymer T1 and polymer T2, a cross-linker (TETRAD-X manufactured by Mitsubishi Gas Chemical Company, Inc.), and bistrifluoromethanesulfonimide were mixed to have a dry weight ratio of 46:40:2:2, and thus an acryl-based adhesive T was obtained. The molecular-weight distribution of the acryl-based adhesive T was 18.

Example 1

With the use of the organic dye-containing resin (P-1) obtained in Manufacturing Example 1, a monolayer black film having a thickness of 150 μm was manufactured as follows. Specifically, the organic dye-containing resin (P-1) was extruded with the use of a Φ50-mm vented single-screw extruder at a discharge rate of 20 kg/hr, filtration was carried out with a polymer filter (filtration precision: 20 μm), the organic dye-containing resin (P-1) was discharged at a temperature of 240° C. with the use of a manifold die having a width of 300 mm, was nipped with metal mirror finish rolls of 90° C. and 95° C., and was taken up at a rate of 8.1 m/mm.

The values of L*, a*, and b* of the black film obtained through the film manufacturing were obtained in accordance with the section [Coal-Blackness]. In addition, the black film obtained through the film manufacturing was stretched twofold in one axial direction in accordance with the section [Twofold Stretching in One Axial Direction], and then the total light transmittance of the stretched film was measured in accordance with the section [Total Light Transmittance]. Furthermore, an adhesive resin layer was formed on the black film obtained through film manufacturing in accordance with the section [Application of Adhesive Resin Layer], a decorative molded product was then fabricated in accordance with the section [Fabrication of Decorative Molded Product], and the color tone of the decorative molded product was observed visually in accordance with the section [Check on See-Through State in Decorative Molded Product]. The results are shown in Table 2.

Examples 2 to 7, 12

Black films were manufactured in a similar manner to that in the Example 1 except that the organic dye-containing resins indicated in Table 2 were used and the take-up rate during the film manufacturing was changed to obtain the thicknesses indicated in Table 2. Then, the evaluations were carried out similarly to Example 1. The results are shown in Table 2.

Example 8

The acryl-based resin (Q) of Manufacturing Example 11 was used as a transparent thermoplastic resin that was to serve as a surface protection layer, and the acryl-based resin (Q) was extruded with the use of a Φ30-mm vented single-screw extruder at a discharge rate of 5 kg/hr. At the same time, the organic dye-containing resin (P-1) of Manufacturing Example 1 was used to serve as a black layer, and the organic dye-containing resin (P-1) was extruded with the use of a Φ50-mm vented single-screw extruder at a rate of 15 kg/hr.

Then, each of the above was laminated with the use of a multi-manifold die having a width of 300 mm, extruded at a temperature of 240° C., nipped with metal mirror finish rolls of 90° C. and 95° C., and taken up at a rate of 6.2 m/min. Thus, a two-layer black layer (laminate film) having a total thickness of 200 μm with a surface protection layer having a thickness of 50 μm and a black layer having a thickness of 150 μm was manufactured.

Then, the evaluations were carried out similarly to Example 1. The results are shown in Table 2.

Examples 9 to 11, 13

Laminate films were manufactured in a similar manner to that in Example 8 except that the transparent thermoplastic resin composing the surface protection layer and the organic dye-containing resin composing the black layer were changed as summarized in Table 2. Then, the evaluations were carried out similarly to Example 8.

Comparative Examples 1 to 3, 10, 11

Black films were manufactured in a similar manner to that in the Example 1 except that the organic dye-containing resins indicated in Table 3 were used and the take-up rate during the film manufacturing was changed to obtain the thicknesses indicated in Table 3. Then, the evaluations were carried out similarly to Example 1.

Comparative Examples 4 to 9

Laminate films were manufactured in a similar manner to that in Example 8 except that the transparent thermoplastic resin composing the surface protection layer and the organic dye-containing resin composing the black layer were changed as summarized in Table 3 and the take-up rate during the film manufacturing was changed to obtain the thicknesses indicated in Table 3. Then, the evaluations were carried out similarly to Example 8.

TABLE 2

| | Surface Protection Layer | | Black Layer | | | | Coal-Blackness | | | Total Light Transmittance after Twofold Stretching (%) | See-Through State in Decorative Molded Product |
|---|---|---|---|---|---|---|---|---|---|---|---|
| | Resin | Thickness (μm) | Resin | Thickness T (μm) | Dye Total Concentration C (%) | C × T | L* | a* | b* | | |
| Example 1 | — | — | P-1 | 150 | 1.7 | 255 | 7.18 | −0.24 | −1.15 | 1.6 | A |
| Example 2 | — | — | P-2 | 150 | 1.7 | 255 | 7.18 | −0.15 | −1.65 | 1.8 | A |
| Example 3 | — | — | P-1 | 550 | 1.7 | 935 | 7.03 | −0.19 | −1.04 | 0.0 | A |
| Example 4 | — | — | P-3 | 550 | 0.4 | 220 | 7.58 | −0.30 | −1.50 | 3.0 | A |
| Example 5 | — | — | P-4 | 45 | 5.0 | 225 | 7.18 | −0.24 | −1.15 | 2.9 | A |
| Example 6 | — | — | P-9 | 150 | 1.7 | 255 | 7.91 | −0.25 | −1.25 | 1.6 | A |
| Example 7 | — | — | P-10 | 150 | 1.7 | 255 | 9.73 | −0.25 | −1.75 | 0.8 | A |
| Example 8 | Q | 50 | P-1 | 150 | 1.7 | 255 | 7.12 | −0.21 | −0.94 | 1.5 | A |
| Example 9 | R | 50 | P-1 | 150 | 1.7 | 255 | 7.95 | −0.21 | −1.29 | 1.4 | A |
| Example 10 | S | 50 | P-1 | 150 | 1.7 | 255 | 9.50 | −0.29 | −1.21 | 1.5 | A |
| Example 11 | R | 50 | P-9 | 150 | 1.7 | 255 | 7.98 | −0.27 | −1.34 | 1.5 | A |
| Example 12 | — | — | P-11 | 150 | 1.7 | 255 | 7.17 | −0.27 | −1.14 | 1.5 | A |
| Example 13 | X-2 | 50 | P-1 | 150 | 1.7 | 255 | 7.16 | −0.22 | −1.14 | 1.5 | A |

TABLE 3

| | Surface Protection Layer | | Black Layer | | | | | | | Total Light Transmittance after Twofold Stretching (%) | See-Through State in Decorative Molded Product |
|---|---|---|---|---|---|---|---|---|---|---|---|
| | | | | | Dye | | | Coal-Blackness | | | |
| | Resin | Thickness (μm) | Resin | Thickness T (μm) | Total Concentration C (%) | C × T | L* | a* | b* | | |
| Comparative Example 1 | — | — | P-5 | 150 | 0.85 | 128 | 7.18 | −0.25 | −1.11 | 8.2 | B |
| Comparative Example 2 | — | — | P-1 | 40 | 1.7 | 68 | 8.15 | −0.24 | −1.15 | 15.7 | B |
| Comparative Example 3 | — | — | P-6 | 150 | 0.3 | 45 | 9.00 | −0.35 | −1.36 | 20.4 | B |
| Comparative Example 4 | Q | 50 | P-5 | 150 | 0.85 | 128 | 7.77 | −0.23 | −1.07 | 8.2 | B |
| Comparative Example 5 | Q | 50 | P-1 | 40 | 1.7 | 68 | 7.87 | −0.22 | −1.15 | 15.7 | B |
| Comparative Example 6 | Q | 50 | P-6 | 150 | 0.3 | 45 | 8.63 | −0.34 | −1.45 | 20.4 | B |
| Comparative Example 7 | R | 50 | P-5 | 150 | 0.85 | 128 | 7.59 | −0.38 | −1.12 | 8.2 | B |
| Comparative Example 8 | R | 50 | P-1 | 40 | 1.7 | 68 | 7.71 | −0.31 | −1.19 | 15.7 | B |
| Comparative Example 9 | R | 50 | P-6 | 150 | 0.3 | 45 | 9.07 | −0.34 | −1.39 | 20.4 | B |
| Comparative Example 10 | — | — | P-7 | 150 | 1.7 | 255 | 7.95 | 3.59 | −3.90 | 7.9 | B |
| Comparative Example 11 | — | — | P-8 | 150 | 1.7 | 255 | 10.50 | −0.05 | −0.56 | 0.0 | A |

Examples 1 to 13 revealed that the total light transmittance obtained after twofold stretching resulted in no more than 3% when a predetermined dye concentration, a predetermined thickness, and the expression C×T≥210 (1) were satisfied. In addition, a color tone difference did not occur among identical decorative molded products when the decorative molded products were actually fabricated, and the decorative molded products that excelled in deep and clear coal-blackness were obtained, yielding to a favorable result.

On the basis of the result of Example 2, a favorable result was obtained when two types of organic dyes other than black were used. On the basis of the results of Examples 1 to 5, a favorable result was obtained when the thermoplastic resin (A) composing the black film was methacrylic resin. On the basis of the results of Examples 6 and 7, a favorable result was obtained also when the thermoplastic resin (A) composing the black film was resin other than methacrylic resin (polycarbonate resin, styrene-based resin).

On the basis of the results of Examples 8, 9, 11, and 13, a favorable result was obtained when methacrylic resin was used for the surface protection layer. In the Example 10, a resin containing polyvinylidene fluoride as a primary component was used for the surface protection layer, but a favorable result was obtained in coal-blackness. In Example 12, no surface protection layer was provided, and the thermoplastic resin (A) that did not include a structural unit derived from an acrylic acid alkyl ester having a carbon number of 6 to 12 was used, but a favorable result was obtained in coal-blackness. In Example 13, the transparent thermoplastic resin (B) that did not include a structural unit derived from an acrylic acid alkyl ester having a carbon number of 6 to 12 was used to provide the surface protection layer, but a favorable result was obtained in coal-blackness. In Examples 1 to 11, a defect at the time or trimming occurred less than in Examples 12 and 13.

The results of Comparative Examples 1 to 9 revealed that the total light transmittance obtained after twofold stretching exceeded 3.0% when the expression C×T≥210 (1) was not satisfied. In addition, a color tone difference occurred among identical decorative molded products when the decorative molded products were actually fabricated, and the decorative molded products that excelled in deep and clear coal-blackness could not be obtained. On the basis of the result of Comparative Example 10, the absolute values of a* and b* each exceeded 2.0 when only one type of organic dye was used. Furthermore, the total light transmittance obtained after twofold stretching exceeded 3%, a color tone difference occurred among identical decorative molded products when the decorative molded products were actually fabricated, and the decorative molded products that excelled in deep and clear coal-blackness could not be obtained.

On the basis of the result of Comparative Example 11, the value of L* exceeded 10 when pigment (carbon black) was used. In addition, the total light transmittance obtained after twofold stretching was as excellent as 0%, and a color tone difference did not occur among identical decorative molded products when the decorative molded products were actually fabricated. However, a whitish hue was observed due to the reflection of light off the pigment particle surface, and deep and clear coal-blackness was not perceived. In addition, in Comparative Example 11, clogging traceable to the pigment gradually accumulated in the polymer filter, and the pressure difference across the polymer filter increased. As a result, a continuous operation of 16 hours or longer could not be achieved.

REFERENCE SIGNS LIST

1 Black layer
2 Surface protection layer
3 Adhesive resin layer
4 Base material
5 Binder layer
6 Layer composed of injection resin (Base material)
10 Decorative molded product The inventions claimed is:

1. A black film comprising:
a thermoplastic resin (A) comprising two or more types of dyes other than black, wherein
a thickness T is 45 to 550 μm,
the thermoplastic resin (A) is a composition containing a methacryl-based polymer (A1) in which the content of a structural unit derived from methyl methacrylate is no less than 90 mass % and the content of a structural unit derived from an acrylic acid alkyl ester having a carbon number of 6 to 12 is less than 5 mass % and an acryl-based copolymer (A2) in which the content of a structural unit derived from an acrylic acid alkyl ester having a carbon number of 6 to 12 is more than 5 mass %,
a mass ratio of the methacryl-based polymer (A1) to the acryl-based copolymer (A2) is in a range of from 98/2 to 50/50,
a total concentration C of the dyes other than black is 0.4 to 5 mass % with respect to the thermoplastic resin (A),
the total concentration C of the dyes and the thickness T satisfy the following expression (1):

$$C \times T \geq 210 \qquad (1)$$

wherein in a L*a*b* color system measurement compliant with JIS Z 8781-4, L* (lightness) is no more than 10, an absolute value of a* is no more than 2.0, and an absolute value of b* is no more than 2.0, and
a total light transmittance obtained after the black film is stretched twofold in one axial direction at a temperature higher than a glass transition temperature by 20° C. is no more than 3.0%.

2. The black film according to claim 1, further comprising a surface protection layer comprising a transparent thermoplastic resin (B),
wherein a total thickness is 45 to 550 μm.

3. The black film according to claim 1, wherein the thermoplastic resin (A) and/or the transparent thermoplastic resin (B) are/is a methacrylic resin.

4. The black film according to claim 3, wherein
the methacrylic resin comprises an acryl-based copolymer (A2) having a structural unit derived from an acrylic acid alkyl ester having a carbon number of 6 to 12, and
a content of the structural unit derived from the acrylic acid alkyl ester having a carbon number of 6 to 12 is 2.5 to 25.0 mass % with respect to the methacrylic resin.

5. A method of manufacturing the black film according to claim 1, comprising extrusion molding through a polymer filter.

6. A decorative molded product, wherein the black film according to claim 1 is laminated on a surface of a base material.

7. The black film according to claim 1, wherein the acryl-based copolymer (A2) contains a multilayer structure rubber particle composed of a graft copolymer.

8. The black film according to claim 7, wherein the multilayer structure rubber particle has a cross-link polymer layer containing a structural unit derived from an acrylic acid alkyl ester having a carbon number of 6 to 12 and is a multilayer structure rubber particle (Y) having a particle size of 0.05 to 0.3 μm.

* * * * *